(12) United States Patent
Nakamura (10) Patent No.: US 7,689,882 B2
(45) Date of Patent: Mar. 30, 2010

(54) FAULT DIAGNOSIS IN RELAYING DATA AMONG A PLURALITY OF NETWORKS

(75) Inventor: Michio Nakamura, Toyoake (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 349 days.

(21) Appl. No.: 11/511,387

(22) Filed: Aug. 29, 2006

(65) Prior Publication Data

US 2007/0061631 A1    Mar. 15, 2007

(30) Foreign Application Priority Data

Aug. 29, 2005   (JP) .............. 2005-247814

(51) Int. Cl.
*G01R 31/28* (2006.01)
*G01R 31/08* (2006.01)
(52) U.S. Cl. ............ 714/724; 714/712; 370/241; 370/242
(58) Field of Classification Search ............ 714/724, 714/712; 370/241, 242
See application file for complete search history.

(56) References Cited

U.S. PATENT DOCUMENTS

| | | | | |
|---|---|---|---|---|
| 5,583,848 | A | * | 12/1996 | Glitho .................... 370/248 |
| 5,982,595 | A | * | 11/1999 | Pozzuoli ................... 361/62 |
| 6,038,219 | A | * | 3/2000 | Mawhinney et al. ........ 370/242 |
| 6,463,037 | B1 | * | 10/2002 | Ooyoshi et al. ............ 370/242 |
| 6,879,563 | B1 | | 4/2005 | Tomita et al. |
| 2001/0025330 | A1 | | 9/2001 | Oi et al. |
| 2002/0071385 | A1 | * | 6/2002 | Ebara ...................... 370/216 |
| 2002/0156916 | A1 | | 10/2002 | Watanabe |

FOREIGN PATENT DOCUMENTS

| JP | A-H07-074746 | 3/1995 |
|---|---|---|
| JP | A-H10-233783 | 9/1998 |
| JP | 2000-244548 | 9/2000 |
| JP | A-2001-282569 | 10/2001 |

(Continued)

OTHER PUBLICATIONS

Glitho, "Isolating Faulty Routing Tables in SS7 Networks: Present and Future", IEEE, vol. 34, No. 5, May 1996, pp. 98-104.*

(Continued)

*Primary Examiner*—John J Tabone, Jr.
(74) *Attorney, Agent, or Firm*—Nixon & Vanderhye PC (57) ABSTRACT

A network relay apparatus relays data accompanied by additional information among plural networks through input ports and output ports. In the apparatus, a deciding unit decides, from the output ports, an objective output port to which the data inputted via any one of the input ports is to be inputted, on the basis of the additional information of the data inputted. An output unit outputs the inputted data through the decided objective output port. A producing unit produces diagnostic data to which the additional information including information indicating the decided objective output port is added, and a providing unit provides the deciding unit with the produced diagnostic data. Further, a fault diagnostic unit is provided to determine whether a fault has occurred in the network relay apparatus on the basis of information concerning the diagnostic data and the decided objective output port.

15 Claims, 7 Drawing Sheets

FOREIGN PATENT DOCUMENTS

| | | |
|---|---|---|
| JP | A-2002-044113 | 2/2002 |
| JP | 2002-319957 | 10/2002 |
| JP | A-2003-258833 | 9/2003 |
| WO | WO 96/21301 | 7/1996 |
| WO | WO 2005/096564 A | 10/2005 |

OTHER PUBLICATIONS

European Search Report.

Glitho, "Isolating Faulty Routing Tables in SS7 Networks: Present and Future", IEEE Communications Magazine, IEEE Service Center, New York, NY, US, vol. 34, No. 5, May 1996, pp. 98-104, XP000574146.

Bradley et al., "Detecting Disruptive Routers: A Distributed Network Monitoring Approach", IEEE Network, IEEE Service Center, New York, NY, US, vol. 12, No. 5, Sep. 1998, pp. 50-60, XP000875015.

Office Action dated Oct. 27, 2009 in Japanese Patent Application No. 2005-247814 with English translation of the official communication.

* cited by examiner

FAULT DIAGNOSIS IN RELAYING DATA AMONG A PLURALITY OF NETWORKS

CROSS-REFERENCE TO RELATED APPLICATION

This application is based on and claims the benefit of priorities from earlier Japanese Patent Application No. 2005-247814 filed on Aug. 29, 2005 the description of which is incorporated herein by reference.

BACKGROUND OF THE INVENTION

1. Technical Field of the Invention

The present invention relates to a network relay apparatus which relays data between a plurality of communication networks.

2. Related Art

A network relay apparatus has a plurality of input/output ports each of which is connected to each of a plurality of communication networks (hereinafter referred to just as "networks") so as to enable communication therebetween. In this apparatus, when a data is relayed from one network to another network, the data is inputted from an input port connected to the former network, and an output port connected to the latter network is decided based on additional information on the input data, so that the data is outputted from the decided output port. The "additional information" herein refers, for example, to such information that indicates the type of data and an addressee of the data, i.e. information on anything other than the data body.

In order to improve reliability in relaying data in the network relay apparatuses which are arranged as mentioned above, various techniques have been suggested lately. For example, Japanese Published Unexamined Application No. 2000-244548 suggests a technique in which a buffer is provided for each of the types of data to be relayed to prevent vanishment of data when the data is relayed.

However, in the above network relay apparatuses, depending on a fault that has occurred in the apparatus, input data tends not to be outputted from a correct output port from which the data should have been originally outputted. The reliability of the above apparatuses therefore cannot be sufficiently high.

For example, in a network relay apparatus, a data table is generally referenced in deciding an output port from which the data inputted from an input port should be outputted, the data table cataloging correspondences between pieces of additional information on the data and output ports. Under such circumstances, if a fault occurs by which the catalog contents of the data table are vanished or rewritten for some reason, the correspondences between the additional information and the output ports may turn out to be wrong, or rather no suitable correspondences may turn out to exist in the data table.

In this case, if an output port data corresponding to the additional information on the data inputted from an input port has been deleted from the data table, the data will no longer be outputted. Also, if the output port data corresponding to the additional information has been rewritten, the data will not be outputted from a correct output port from which the data should have been originally outputted.

In view of the above, it is desirable to provide an arrangement for a network relay apparatus, which is capable of detecting occurrences of such faults. An example of an arrangement for detecting occurrences of such faults may be one that provides a process which is dedicated to detect such faults by, for example, continuously or periodically checking contents of an incorporated memory or operational conditions of hardware. However, such an arrangement may not be realistic from a viewpoint of processing load or processing time required for checking.

SUMMARY OF THE INVENTION

The present invention has been made in order to resolve the problems set forth above, and has as its object to readily enable detection of faults that have occurred in a network relay apparatus.

In order to accomplish the above object, the present invention provides, as one aspect thereof, a network relay apparatus having a plurality of input ports and a plurality of output ports each communicably connected to a plurality of networks, data accompanied by additional information being relayed among the plurality of networks through the input ports and the output ports, the apparatus comprising: a deciding unit configured to decide, from the output ports, an objective output port to which the data inputted via any one of the input ports is to be inputted, on the basis of the additional information of the data inputted; an output unit configured to output the inputted data through the decided objective output port; a producing unit configured to produce diagnostic data to which the additional information including information indicating the decided objective output port is added; a providing unit configured to provide the deciding unit with the produced diagnostic data; and a fault diagnostic unit configured to determine whether a fault has occurred in the network relay apparatus on the basis of information concerning with the diagnostic data and the decided objective output port.

It is preferred that the fault diagnostic unit is configured to determine that the fault has occurred in the network relay apparatus in a first case where the diagnostic data is not outputted by the output unit through the decided objective output port or a second case where one of the output ports through which the data is outputted by the output means is inconsistent with the decided objective output port.

In this arrangement, where a diagnostic data is not properly outputted from an output port, it may result that nonexistent or inappropriate output port is selected, or it is highly likely that a fault of outputting no data, for example, has occurred. In this way, by checking whether or not a diagnostic data has been properly outputted from an output port, diagnosis can be made as to occurrences of faults.

Under such circumstances, such processes are required as to produce a diagnostic data and to check the input/output conditions of the diagnostic data. These processes are associated with the essential operation of the network relay apparatus. Therefore, comparing with the conventional arrangement providing a process which is dedicated to detect faults, processing load or processing time may not be increased. Accordingly, in the present invention, occurrences of faults in the apparatus can be readily diagnosed by only producing a diagnostic data and by checking the input/output conditions of the diagnostic data.

DETAILED DESCRIPTION OF THE PREFERRED EMBODIMENTS

Embodiments according to the present invention will now be described below with reference to the drawings.

(1) Entire Arrangement:

A network relay apparatus adopted by the embodiments according to the present invention is arranged as an apparatus for relaying one or more data between communication networks for vehicles according to CAN (Controller Area Network), i.e. in-vehicle networks which will hereinafter be referred to simply as "networks". CAN is a protocol for performing half-duplex serial communication, which is standardized according to ISO (International Organization for Standardization) and has standards ISO11519 and ISO11898. According to the protocol of CAN, apparatuses serving as nodes for communication (ex., various types of sensors and actuators loaded on vehicles) are generally connected to a two-wire bus for differential signals. In this bus-type network topology, any of apparatuses connected to the bus can start communication if there is room in the bus. In case a plurality of the apparatuses simultaneously start communication, the bus is adjusted utilizing a CSMA/NBA (Carrie Sense Multiple Access with Non-destructive Bitwise Arbitration) system, and one apparatus wins a right of transmission. Each of data used for CAN is transmitted as a message frame in a predetermined format. The message frame is added with an ID (Identifier) which is indicative, for example, of transmission priority and a type of the data. Adjustment of the bus and selection of data are carried out using the IDs. Since the CAN specification is known, detailed description is omitted here.

Figure 8:
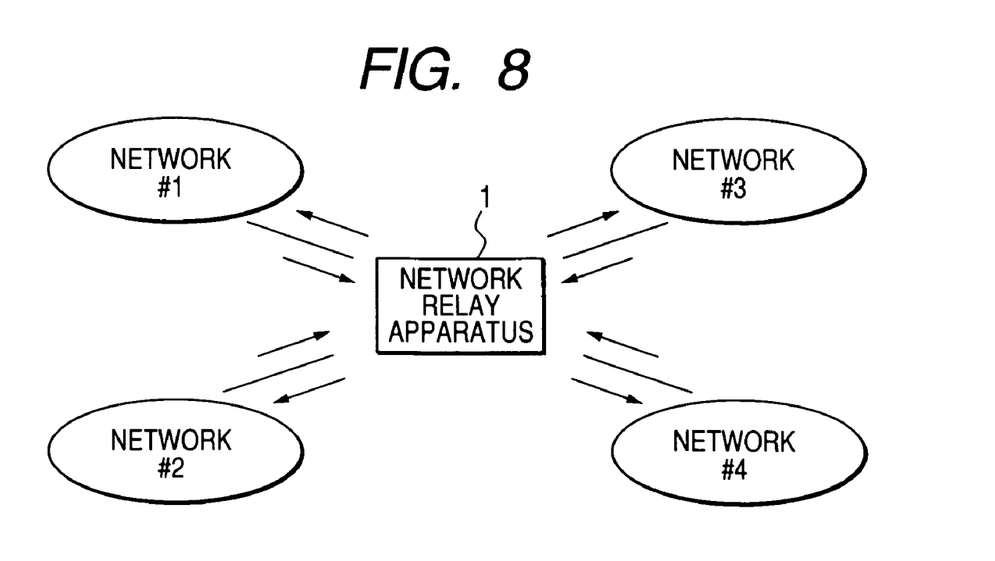
FIG. 8 is a schematic view illustrating an entire arrangement of a network system including the network relay apparatus according to the present invention.

FIG. 8 illustrates an entire arrangement of a network system including the network relay apparatus according to the present embodiment. As shown in the figure, a network relay apparatus 1 is located between a plurality of (four are shown in the figure) networks #1 to #4 according to CAN as mentioned above to enable data relay between the networks #1 to #4.

Figure 1:
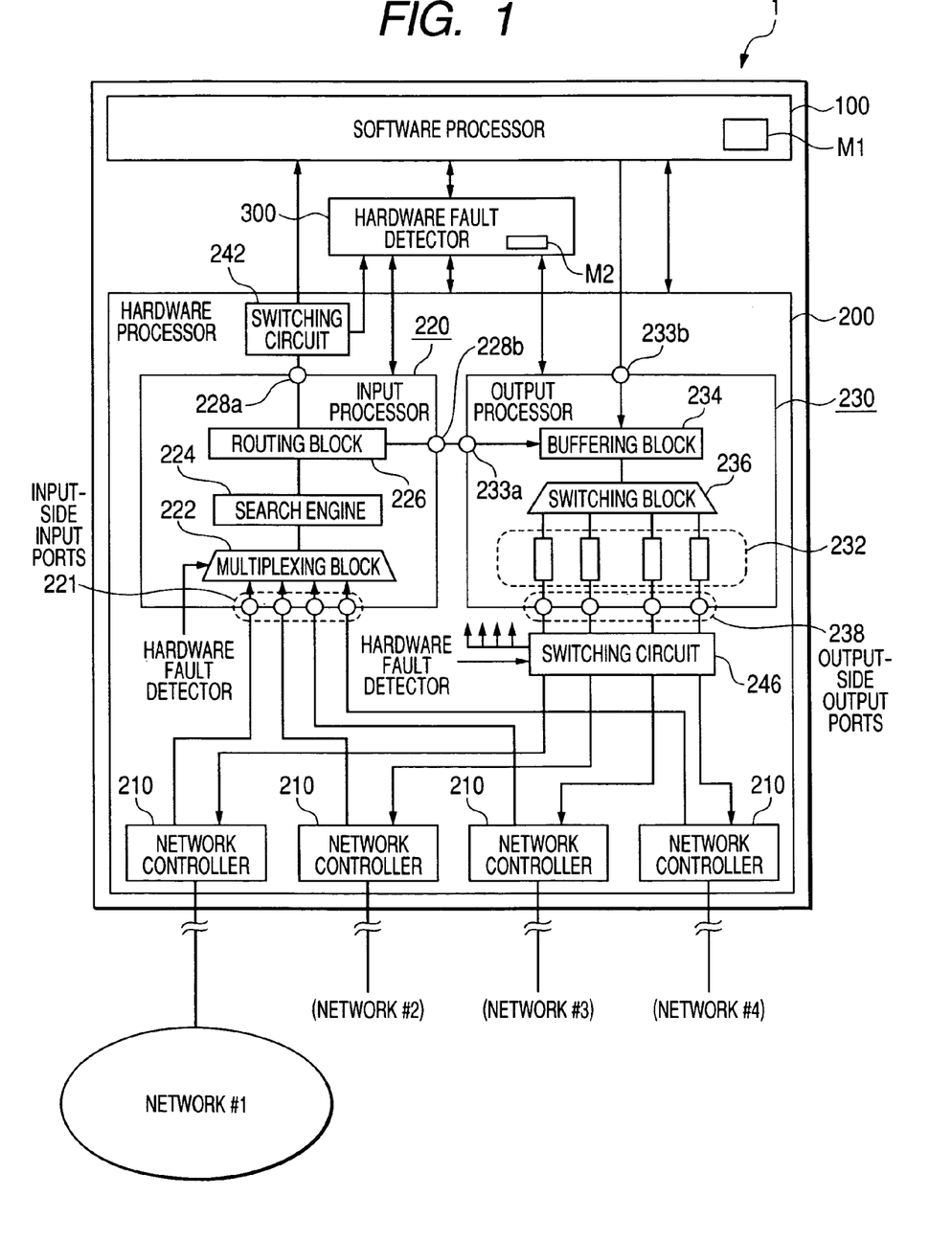
FIG. 1 is a block diagram functionally illustrating an arrangement of a network relay apparatus according to an embodiment of the present invention.

FIG. 1 functionally illustrates an internal arrangement of the network relay apparatus 1. As shown in the figure, the network relay apparatus 1 includes a software processor 100 for controlling an operation of the entire network relay apparatus 1 according to a program stored in an internal memory M1, a hardware processor 200 for controlling data relay between the network relay apparatus 1 and an external network, and a hardware fault detector 300 for performing various processes as will be described later according to the program stored in an internal memory M2.

The hardware processor 200 has a plurality of network controllers 210, an input processor 220, an output processor 230, a switching circuit 242 and a switching circuit 246. Each of the network controllers 210 controls data input/output between the networks. The input processor 220 performs routing processing of one or more data, which are inputted from the networks via the network controllers 210. The output processor 230 outputs the data that have been subjected to routing processing in the input processor 220, or the data that have been received from the software processor 100, to the network controllers 210. The switching circuit 242 is provided in a data path between the input processor 220 and the software processor 100. The switching circuit 246 is provided in a path between the output processor 230 and the network controllers 210.

The input processor 220 has a plurality (four in the figure) of input-side input ports 212, a multiplexing block 222, a search engine 224, a routing block 226 and two input-side output ports 228a, 228b (according to need, represented by a reference 228). The input-side input ports 221 receive data from the respective network controllers 210. The multiplexing block 222 multiplexes the data inputted from the input-side input ports 221. The search engine 224 searches an output path for each type of the data that has been multiplexed by the multiplexing block 222. The routing block 226 controls the output of the data based on the results of the search conducted by the search engine 224. The input-side output port 228a outputs the data that have been outputted from the routing block 226 to the side of the software processor 100. The input-side output port 228b outputs the data that have been outputted from the routing block 226 to the side of the output processor 230.

The search engine 224 searches for an output path corresponding to the type of a data specified by header information of the input data, and passes the input data to the routing block 226 together with path information indicative of the searched output path. In the search, the search engine 224 references a data table stored in the internal memory of the input processor 220. The data table catalogs correspondences between types of data (IDs indicative of types) and output paths (output-side output ports 238 as will be described later, or the software processor 100) to each of which an apparatus is connected so that a data of the type can be transmitted. Since a network arrangement in a vehicle is not generally changed, the contents of catalog in the data table are also rendered to have an unchangeable static arrangement.

The routing block 226 outputs the data and the path information passed from the search engine 224 to the side of the software processor 100 via the input-side output port 228a if the path information indicates the software processor 100, and to the side of the output processor 230 via the input-side output port 228b if the path information indicates the output-side output ports 238.

The output processor 230 has a plurality (four in the figure) of output memories 232, two output-side input ports 233a, 233b (according to need, represented by a reference 233), a buffering block 234, a switching block 236 and a plurality (four in the figure) of output-side output ports 238. The output memories 232 store the data to be outputted from the respective network controllers 210. The output-side input port 233a receives the data inputted from the routing block 226 of the input processor 220. The output-side input port 233b receives the data inputted from the software processor 100. The buffering block 234 receives the data inputted via the output-side input ports 233a, 233b. The switching block 236 outputs the data inputted to the buffering block 234 to the output memories 232. The output-side output ports 238 output the data stored in the respective output memories 232.

The output memories 232 are queue (or FIFO (First In First Out)) type memories provided for the respective network controllers 210. The buffering block 234 outputs the data and the path information that have been inputted via the output-side input ports 233a, 233b, to the switching block 236. The switching block 236 outputs the data inputted from the buffering block 234 to an output path indicated by the path information, i.e. to any of the output memories 232. In this way, the output memories 232 that have received the data inputted by the switching block 236 sequentially output each of the data in the order of earlier input, to the side of the network controllers 210 via the output-side output ports 238.

Among the data outputted via the input-side output port 228a of the input processor 220, the switching circuit 242 outputs diagnostic data, which will be described later, to the hardware fault detector 300, and data other than the diagnostic data to the software processor 100. Whether the data is diagnostic or not is determined based on the header information of the data.

Among the data outputted from the output memories 232 of the output processor 230, the switching circuit 246 outputs the diagnostic data to the hardware fault detector 300, or selectively outputs data other than the diagnostic data to the corresponding network controllers 210. Also, the switching circuit 246 selectively shuts down paths upon receipt of a command from the hardware fault detector 300, so that data other than informative data, which will be described later, are not outputted to the paths directed to the network controllers 210. It should be appreciated that whether the data is diagnostic or not, or whether the data is informative or not, is determined based on the header information, i.e. in the similar manner as mentioned above.

Figure 2:
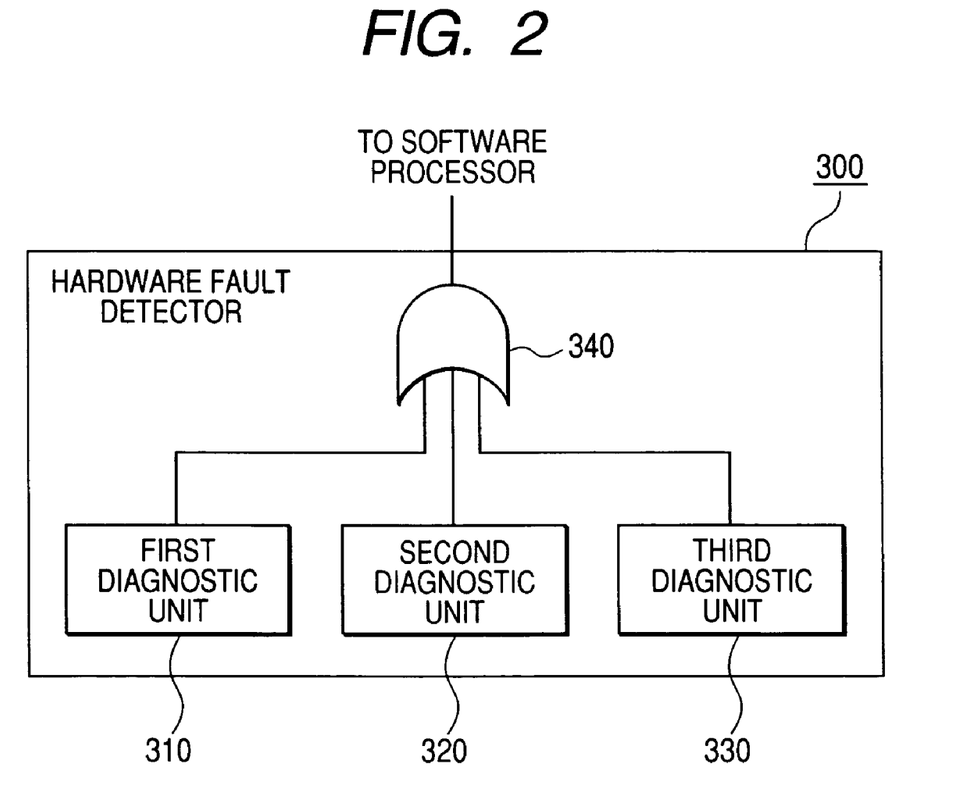
FIG. 2 is a block diagram functionally illustrating an arrangement of a hardware fault detector, according to the present embodiment.

As shown in FIG. 2, the hardware fault detector 300 functionally includes a first diagnostic unit 310 for executing a first fault diagnostic process as will be described later, a second diagnostic unit 320 for executing a second fault diagnostic process as will be described later, a third diagnostic unit 330 for executing a third fault diagnostic process as will be described later, and an OR circuit 340 for producing a signal indicating logical addition of signals which are indicative of the results of the processes in the diagnostic units 310 to 330, and for outputting the signal to the software processor 100.

Figure 3:
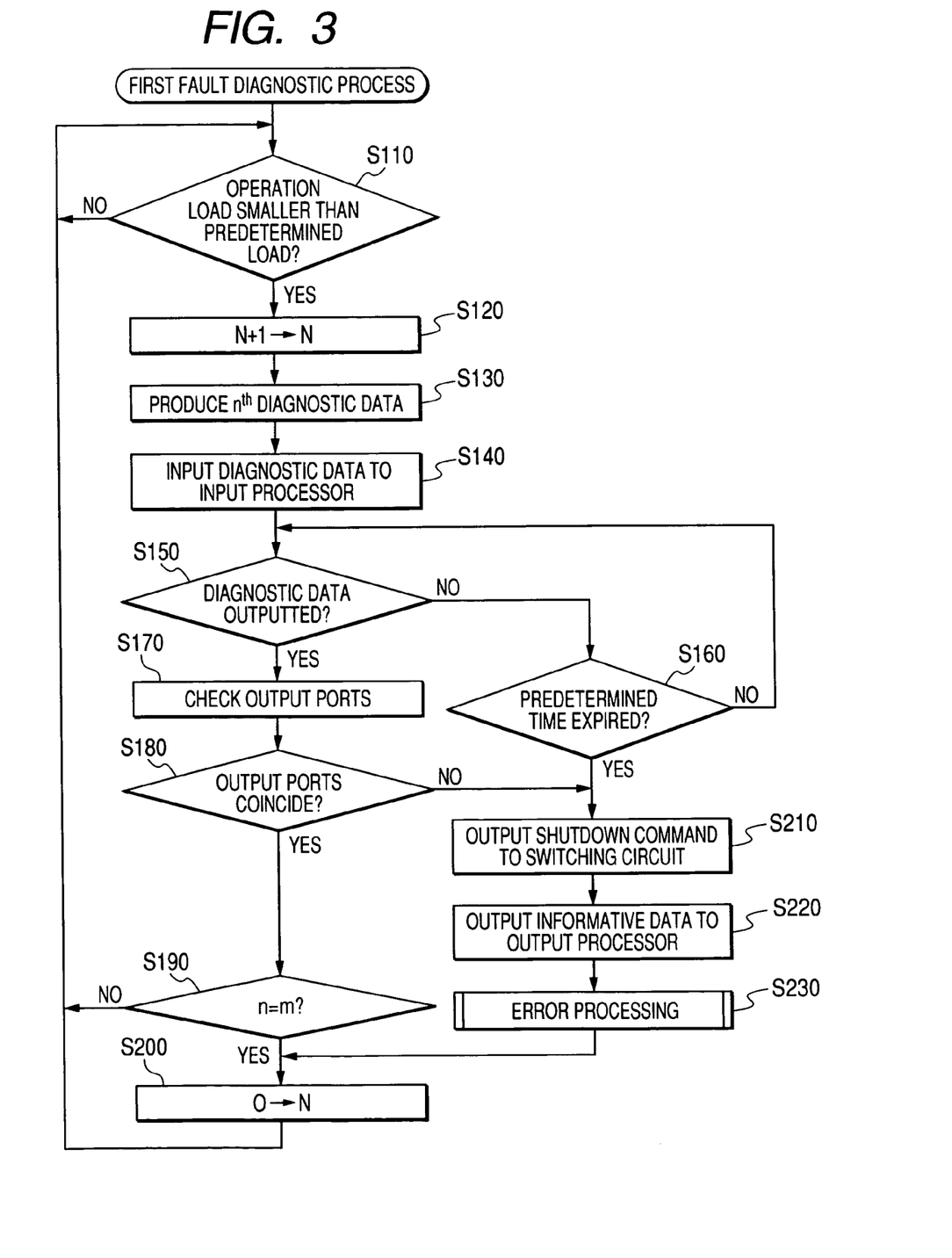
FIG. 3 is a flow diagram illustrating a first fault diagnostic process, according to the present embodiment.

(2) Processes Performed by the Hardware Fault Detector 300:

(2-1) First Fault Diagnostic Process:

With reference to FIG. 3, hereinafter is described a procedure of the first fault diagnostic process performed by the first diagnostic unit 310 of the hardware fault detector 300. This first fault diagnostic process is repeatedly performed after the actuation of the network relay apparatus 1.

When the first fault diagnostic process is started, the network relay apparatus 1 stands by until operation load of the output processor 230 becomes smaller than a predetermined load (step S110: NO). It should be appreciated that in case the operation load is equal to or more than the predetermined load, the network relay apparatus 1 is brought into a state where the operation load becomes large to some extent, so that processing load for the subsequent processes necessarily prevents the original operation of the network relay apparatus 1. In the present embodiment, the hardware fault detector 300 monitors an amount of data standing by for output, i.e. an operation load, in each of the output memories 232 of the output processor 230. At step S110, a determination is made as to whether or not the operation load of the network relay apparatus 1 associated with the standby data amount is smaller than a load which would otherwise cause the processing load for the subsequent processes to prevent the original operation of the network relay apparatus 1 (in particular, whether or not an average value of the data amount of the output memories 232 is smaller than a predetermined value, or whether or not any of the output memories 232 has a data amount equal to or exceeding a predetermined amount).

At step S110, when the operation load at the output processor 230 becomes smaller than the predetermined load (step S110: YES), "1" is added to a variable N whose initial value is "0" (N+1→N) (step S120). A value set for the variable N is hereinafter referred to as "n".

Subsequently, a data for diagnosing fault by an $n^{th}$ pattern (hereinafter referred as a "diagnostic data") is produced (step S130). In the present embodiment, the first diagnostic unit 310 diagnoses faults in the network relay apparatus 1 (the hardware processor 200) by checking input/output of the data in the network relay apparatus 1. However, since a data input/output path in the network relay apparatus 1 differs depending on a type of a data, diagnosis therefor is also required to be performed using a plurality of patterns. In consideration of such circumstances, the present embodiment has an arrangement in which a diagnostic data is produced to pass through an input/output path for each of such patterns.

In particular, a plurality of different "1 to m" patterns ($n \leq m$) are defined, including (1) a pattern in which a diagnostic data is outputted via the input-side output port 228a, (2) a pattern in which a diagnostic data is outputted via any one of the output-side output ports 238, (3) a pattern diagnostic data are outputted via a plurality of the output-side output ports 238 and (4) a pattern in which diagnostic data are outputted via the input-side output port 228a and all of the output-side output ports 238.

At step S130, a diagnostic data is produced, which is for diagnosing faults with the $n^{th}$ pattern, while information on the type of data and information of its being a diagnostic data, are added to the header information. The "type of data" here is an ID indicative of a type of data that should pass through the input-side output port 228a in case of the above (1). In case of the above (2), it is an ID indicative of a type of data that should pass through a specific output-side output port 238. In case of the above (3), it is an ID indicative of a type of data that should pass through each of a plurality of output-side output ports 238. In case of the above (4), it is an ID indicative of a type of data that should pass through each of the input-side output port 228a and each of all of the output-side output ports 238.

The diagnostic data produced at step S130 is then inputted to the multiplexing block 222 of the input processor 220 (step S140). The diagnostic data inputted to the input processor 220 is outputted, as described above, to the side of the software processor 100 or to the side of the output processor 230, together with path information indicative of an output path detected by the search engine 224 according to the type of data. The diagnostic data outputted to the side of the software processor 100 is outputted to the hardware fault detector 300 via the switching circuit 242. On the other hand, the diagnostic data outputted to the side of the output processor 230 is outputted to the hardware fault detector 300 via the switching block 236, the output memories 232 and the switching circuit 246.

Thus, after the diagnostic data have been inputted to the input processor 220, the output of each of the diagnostic data from each of the output-side output ports 238 of the output processor 230 is monitored until expiration of a predetermined time (ex., 100 μs) (step S150: NO, step S160: NO). In this way, the diagnostic data outputted from the output processor 230 are inputted to the hardware fault detector 300 as described above.

When a diagnostic data is outputted before expiration of the predetermined time (step S150: YES), the output port from which the diagnostic data has been outputted is checked (step S170). At this step S170, each of the diagnostic data outputted from the input processor 220 is checked as to which of the input-side output port 228a, and the output-side output ports 238 each of the diagnostic data has routed through. Further, the subject output port is checked as to whether or not it coincides with an output port from which the diagnostic data corresponding to the $n^{th}$ pattern should be outputted.

When the output port checked at step S170 coincides with the output port from which the diagnostic data corresponding to the $n^{th}$ pattern should be outputted (step S180: YES), checking is carried out as to whether or not the value n of the variable N has reached a maximum value m of the patterns to be diagnosed (n=m), or in other words, whether or not diagnosis on faults by all of the patterns has been completed (step S190).

Thus, when the value n of the variable N is determined to have reached the maximum value m at step S190 (step S190: YES), the variable N is initialized (0→N) (step S200), and control returns to step 5110. On the other hand, when a determination is made that the value n of the variable N has not reached the maximum value m (step S190: NO), control returns to step S110 without initializing the variable N.

When the predetermined time has expired without the output of the diagnostic data from the hardware processor 200 at step S150 described above (step S160: YES), or when no coincidence has been determined as having occurred between the output ports at step S180 (step S180: NO), a diagnosis is given that some faults have occurred, followed by outputting a shutdown command to the switching circuit 246 (step S210). From the point onwards, the switching circuit 246 that has inputted the shutdown command comes to selectively shut down the paths extending to the network controllers 210, so that no data other than informative data as will be described later is outputted to the paths.

Subsequently, the informative data is outputted to the buffering block 234 of the output processor 230 (step S220). This informative data is for informing all of the apparatuses (not shown) connected to the networks via the network controllers 210 that data relay will not be performed by the network relay apparatus 1. In short, the informative data is a so-called broadcasting data. The informative data thus inputted to the buffering block 234 is inputted to the switching circuit 246 via the switching block 236 and the output memories 232. Although the switching circuit 246 keeps shutting down output of data after receiving the shutdown command, the informative data is selectively outputted to the network controllers 210. Thus, the informative data is outputted to all of the apparatuses connected to the networks via the network controllers 210.

Then, error processing is carried out (step S230). At this step, a level of output signals for informing the occurrence of faults in the network relay apparatus 1 is fixed at an H level, and the output signals are inputted to the OR circuit 340 (see FIG. 2). Then, the OR circuit 340 starts outputting the H-level signals to the software processor 100. The software processor 100 receives the signals as information of the occurrence of faults in the network relay apparatus 1, and thereafter outputs reset signals to the hardware processor 200. The reset signals are so arranged as to also be inputted to the hardware fault detector 300, so that, upon receipt of the reset signals, the hardware fault detector 300 completes the error processing described above, and control proceeds to step S200.

Alternatively, the output of the reset signals to the hardware processor 200 may be carried out immediately after receipt of the H-level signals from the OR circuit 340, or may be carried out after a specific process or a user's specific operation, for example. In case of the latter, degree of freedom of the timing for resetting the hardware processor 200 can be increased.

Figure 4:
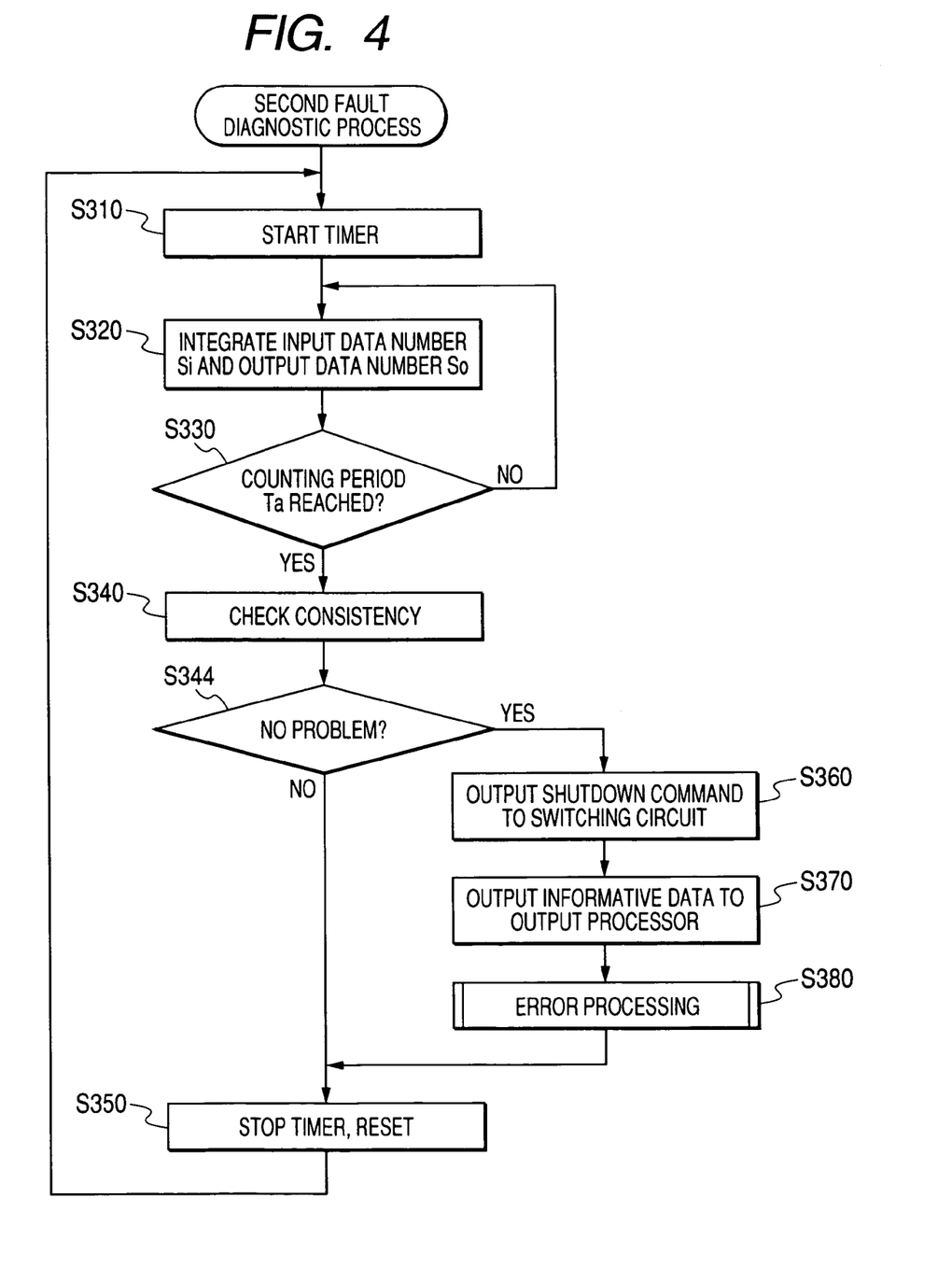
FIG. 4 is a flow diagram illustrating a second fault diagnostic process, according to the present embodiment.

(2-2) Second Fault Diagnostic Process:

With reference to FIG. 4, hereinafter is described a procedure of the second fault diagnostic process taken by the second diagnostic unit 320 of the hardware fault detector 300. The second fault diagnostic process is repeatedly executed after the activation of the network relay apparatus 1.

When the second fault diagnostic process is started, a timer starts counting (step S310). Subsequently, integration of each of input data and output data (step S320) is repeated until a count of the timer started at step S310 reaches a predetermined counting time Ta (step S330: NO). At this step S330, the data inputted to the input-side output port 228b from the search engine 224 through the routing block 226 in the input processor 220 are monitored to calculate the input data number Si by integrating the input data (i.e., the input data number Si excludes the number of data routed to the remaining input-side output port 228a. Similarly, in the output processor 230, data "a" inputted from the output-side input port 233a through the input-side output port 228b and data "c" outputted from the output-side input port 233b are monitored respectively. That is, from a theoretical point of view, the number Si should be equal to Sa, if there is no failure in data transmission in the input path. A number Sa obtained by integrating the data "a" and a number Sc obtained by integrating the data "c" are subjected to summation so as to be outputted as a data number So (=Sa+Sc). Thus, data "b" outputted from the output-side output ports 238 is monitored as the data number So by the calculation.

The data "c", which is data generated through predetermined processing carried out the software processor 100, is not required to be outputted from the network relay apparatus 1. The data "c" is needed only in the apparatus 1.

When the count by the timer has reached the predetermined counting time Ta (step 5330: YES), consistency between the input data number Si and the output data number So integrated so far, is checked (step S340). At this step S340, checking is performed as to whether or not the input data number Si mentioned above coincides with a number obtained by subtracting the number Sc, which is an integration of the data "c" monitored at the preceding step 5330, from the output data number So (Si=So−Sc). When the numbers coincide with each other, the input/output data are determined as having no problem in the consistency.

When it is determined, at step S340, that there is no problem in the consistency (step 5344: NO), the timer is stopped and reset (step S350), and control returns to step S310. On the contrary, when a problem is determined as present in the consistency of the input/output data (step S344: YES), a diagnosis is given that some faults have occurred, as at step S210 of FIG. 3, followed by outputting a shutdown command to the switching circuit 246 (step S360).

Subsequently, in the similar manner as at step S220 of FIG. 3, an informative data is outputted to the buffering block 234 of the output processor 230 (step S370). Then, in the similar manner as at step S230 of FIG. 3, error processing is carried out (step S380). At step S380 as well, a level of output signals for informing the occurrence of faults is fixed at an H level, and the output signals are inputted to the OR circuit 340 (see FIG. 2). After receiving reset signals from the software processor 100, the hardware fault detector 300 completes the error processing as described above, and control to proceeds to step S350.

Figure 5:
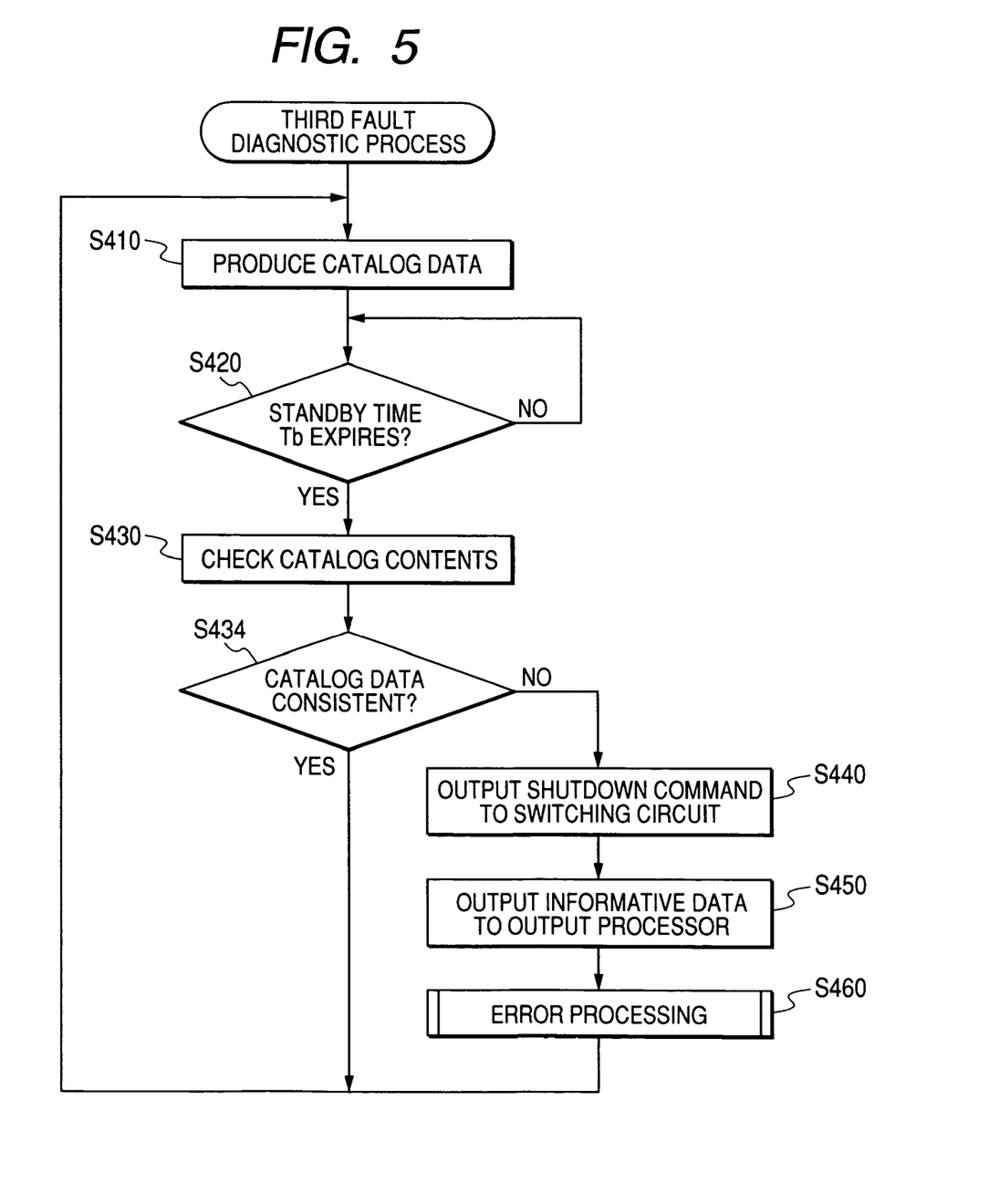
FIG. 5 is a flow diagram illustrating a third fault diagnostic process, according to the present embodiment.

(2-3) Third Fault Diagnostic Process:

With reference to FIG. 5, hereinafter is described a procedure of the third fault diagnostic process taken by the third diagnostic unit 330 of the hardware fault detector 300. The third fault diagnostic process is repeatedly executed after the activation of the network relay apparatus 1.

When the third fault diagnostic process is started, a data indicative of catalog contents of the data table mentioned above (hereinafter referred to as "catalog data") is produced (step S410). The data table is stored in the internal memory of the input processor 220, and cataloging correspondences between types of data and output paths. At this step S410, the data table, per se, i.e. duplication, or parameters (hash values), which are calculated based on the catalog contents of the table data are produced as the catalog data.

After being in a standby state for a predetermined standby time Tb (step S420: NO), once the standby time Tb has expired (step 5420: YES), checking is performed as to whether or not the catalog contents indicated by the catalog data which has been produced at step S410 coincide with the catalog contents in the data table which is stored in the input processor 220 (step S430). At this step S430, if the catalog data produced at step S410 is the data table per se, the catalog contents in the thus produced data table and those in the data table stored in the internal memory are compared to check the consistency. If the catalog data produced at step S410 are parameters, comparison is made between the thus produced parameters and those parameters that have been calculated in the similar manner based on the catalog contents of the data table stored in the internal memory, to check the consistency.

At step S430, when the contents of both of the catalogs are determined to be consistent, (step S434:YES), control returns to step S410. Contrarily, when he contents of both of the catalogs are determined to be inconsistent (step S434: NO), a diagnosis is give that some faults have occurred, as at step S210 of FIG. 3, and a shutdown command is outputted to the switching circuit 246 (step S440).

Subsequently, as at step S220 of FIG. 2, an informative data is outputted to the buffering block 234 of the output processor 230 (step S450). In the similar manner as at step S230 of FIG. 2, error processing is carried out (step S460). At this step S460 as well, a level of output signals for informing the occurrence of faults is fixed at an H level, and the output signals are inputted to the OR circuit 340 (see FIG. 2). Then, after receiving reset signals from the software processor 100, the hardware fault detector 300 completes the error processing as described above, and control returns to step 5410.

(3) Effects:

In the network relay apparatus 1 arranged in this way, when each of the diagnostic data is not properly outputted from an output port (NO at step S180, YES at step S160 in FIG. 3), it is highly likely that some faults have occurred, for example, detecting a nonexistent output port or an inappropriate output port by the search engine 224, or outputting no input data by the output processor 230. Under the circumstances, the network relay apparatus 1 enables diagnosis on the occurrence of faults therein, by checking whether or not the diagnostic data have been properly outputted from the corresponding output ports, respectively.

As described above, in the network relay apparatus 1, the occurrence of faults therein can be readily diagnosed by only producing diagnostic data and checking the input/output conditions of the data. This is because the processes performed in such checking are associated with the essential operation of the network relay apparatus 1, and thus because processing load and processing time are not increased comparing with an arrangement where dedicated processes for fault detection are performed.

In the first fault diagnostic process, it is arranged such that diagnoses on faults are given by each of $1^{st}$ to $n^{th}$ patterns.

These patterns are provided to perform diagnoses with patterns corresponding to all the input/output data paths in the network relay apparatus 1. Accordingly, with the first fault diagnostic process, exhaustive checking can be performed on the possible input/output paths of input data in the network relay apparatus 1. As a result, high precision can be achieved in detecting faults in the network relay apparatus 1.

As described above, the network relay apparatus 1 is in a standby state until the operation load of the network relay apparatus 1 becomes smaller than the predetermined load (NO at step S100 of FIG. 3). In other words, unless the operation load (amount of data to be outputted from the output memories 232) of the network relay apparatus 1 is smaller than the predetermined load, neither diagnostic data are produced, nor diagnoses are given based on the diagnostic data. It should be appreciated that in case the operation load is equal to or more than the predetermined load, the network relay apparatus 1 is brought into a state where the operation load becomes larger than a certain degree, so that processing load for the subsequent processes necessarily prevents the original operation of the network relay apparatus 1. Thus, it is arranged such that, where processing load occurs for the diagnoses based on the diagnostic data, the network relay apparatus 1 is not in the state of being prevented from performing the essential operation due to the processing load. Accordingly, the essential operation of the apparatus is not prevented.

In particular, in the present embodiment, the amount of data to be outputted from the output memories 232 is monitored, and where this amount is large, no diagnostic data are produced. In this way, unnecessary delay, which would have been caused by the diagnostic data, is not tend to occur in outputting other data, thereby preventing the network relay apparatus 1 from performing the original operation.

In the second diagnostic process, the input data number Si and the output data number So are checked. Where there is inconsistency between these two numbers, i.e. where the numbers of input/output data relayed between the apparatuses connected to the network controllers 210 are inconsistent, a diagnosis is given that some faults have occurred in the network relay apparatus 1 (NO at step S344 of FIG. 4). If the consistency between the input data number Si and the output data number So is revealed to be problematic, it is highly likely that faults have occurred, for example, detecting nonexistent output port by the search engine 224, or outputting no input data by the output processor 230. Thus, checking the consistency between these two data numbers enables diagnoses on the occurrences of faults in the network relay apparatus 1.

As described above, in the network relay apparatus 1, faults therein can be diagnosed not only by the first fault diagnostic process based on the diagnostic data, but also by the second fault diagnostic process based on the input data number Si and the output data number So. In this way, high precision can be achieved in detecting faults in the network relay apparatus 1.

The search engine 224 can specify an output path corresponding to the type of an input data, by referencing the data table which presets correspondences between types of data and output paths.

In the third fault diagnostic process, a catalog data indicating the catalog contents in the data table is produced, and then, the catalog contents in the data table at the point when the standby time has expired, and the catalog contents in the catalog data that has been produced in advance are checked as to their consistency. If the catalog contents of the both are inconsistent, a diagnosis is given that faults have occurred (NO at step S434 of FIG. 5). Thus, in the network relay apparatus 1, faults in the network relay apparatus 1 can be diagnosed not only by the first fault diagnostic process based on the diagnostic data, but also by the third fault diagnostic process based on the catalog contents in the data table and the catalog contents indicated by the catalog data. In this way, high precision can be achieved in detecting faults in the network relay apparatus 1.

In each of the fault diagnostic processes, when it is diagnosed that a fault has occurred in the network relay apparatus 1, output of data to the outside of the network relay apparatus 1 through each of the output ports is shut down, by giving a shutdown command to the switching circuit 246 (step S210 of FIG. 3, step S360 of FIG. 4 and step S460 of FIG. 5). Thus, from the point onwards when a fault has been detected as having occurred in the network relay apparatus 1, data output to the outside of the network relay apparatus 1 is shut down, so that wrong data is not outputted from a wrong output port which is different from the one the data should originally have been outputted therefrom. In this way, the apparatuses which are connected via the network controllers 210, or the entire network, can be prevented from being adversely affected in some way or other.

After receiving a shutdown command from the hardware fault detector 300, the switching circuit 246 prevents data from being outputted to the outside of the network relay apparatus 1, but what is prevented from outputting are those data other than the informative data. The informative data is a data to inform all of the apparatuses associated with the networks of the fact that data output from the output ports will be shut down. Accordingly, the informative data can give information to the apparatuses associated with the networks which are connected via the network controllers 210, that communication through the network relay apparatus 1 will be interrupted. In this way, unintended error processings can be prevented from being performed if all of the apparatuses associated with the networks which are connected via the network controllers 210 are arranged such that, for example, once the informative data has been received, no error processing is performed even when periodical communication is interrupted.

(4) Further Embodiments:

(4-1) Second Embodiment:

The second fault diagnostic process of the above embodiments is so arranged that the presence of a problem in the consistency between the input/output data numbers Si and So (NO at step S344 of FIG. 4) is directly diagnosed as the occurrence of a fault. Alternatively, the arrangement may be such that the occurrence of a fault is diagnosed in an indirect manner in case there is a problem in the consistency between the input/output data numbers Si and So.

Figure 6:
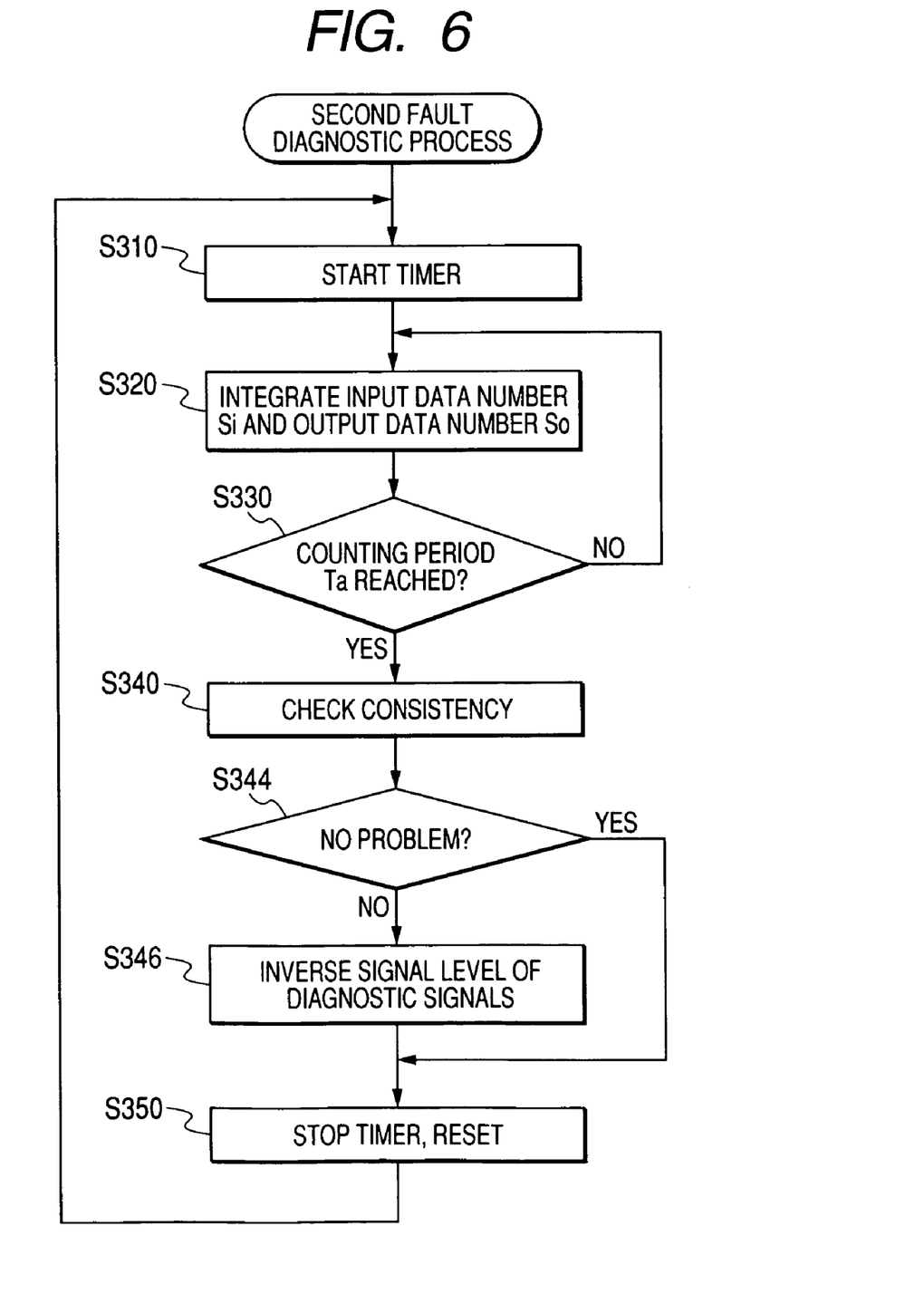
FIG. 6 is a flow diagram illustrating a second fault diagnostic process, according to another embodiment.

To this end, as shown in FIG. 6, for example, if the consistency is determined as being problematic in step S344 (step S344: YES), control may proceed to step S350 without executing steps S360 to S380 of FIG. 4.

If the consistency is determined as being not problematic at step S344 (step S344: NO), a process may be performed to inverse a signal level of the diagnostic signals (step S346), and then control can proceed to step S350. The "diagnostic signals" are the signals produced for diagnosing faults, i.e. signals which function as so-called watchdog pulses. In the present embodiment, the diagnostic signals are inputted to a watchdog counter provided in the hardware fault detector 300. When the signal level of the diagnostic signals has come to be no longer inversed by every counting period Ta, the watchdog counter outputs a signal accordingly. It should be appreciated that the watchdog counter may be provided to other circuit elements which can communicate with the hardware fault detector 300.

Figure 7:
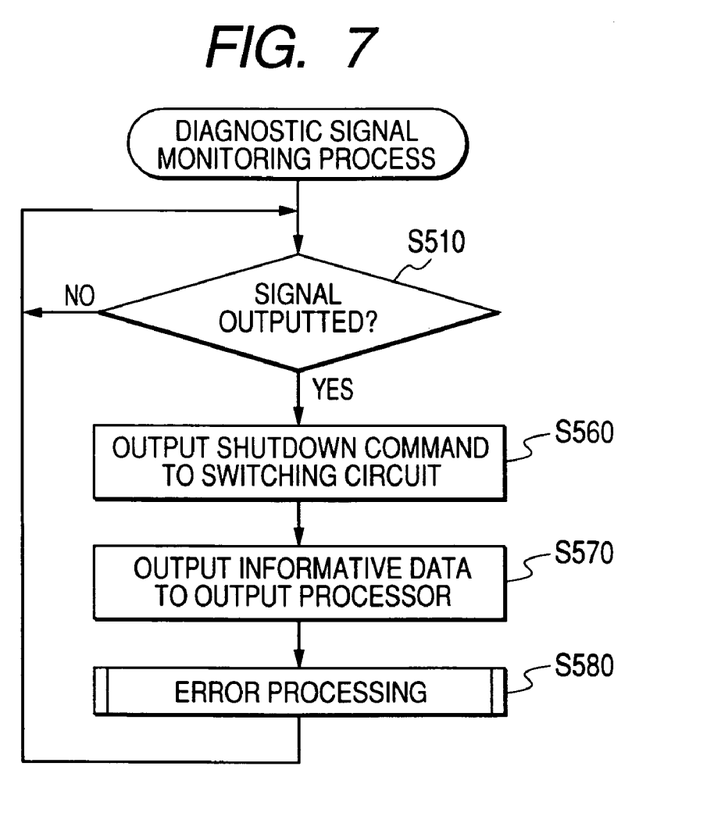
FIG. 7 is a flow diagram illustrating a diagnostic signal monitoring process, according to another embodiment.

Further, the second diagnostic unit 320 may be so arranged as to execute a diagnostic signal monitoring process in parallel with the second fault diagnostic process. A procedure of the diagnostic signal monitoring process is described hereunder with reference to FIG. 7. The diagnostic unit 320 stands by until a signal is outputted from the watchdog counter (step S510: NO). When a signal is outputted from the watchdog counter (step S510: YES), steps S560 to S580, which are the same as steps S360 to S380 of FIG. 4, are executed, and control then returns to step S510.

The arrangement described above may enable diagnosis on the occurrence of faults in the network relay apparatus 1 by checking whether or not a signal has been outputted from the watchdog counter, i.e. whether or not the signal level of the diagnostic signals has been inversed by every certain period (Ta). This is because the signal level of the diagnostic signals is inversed if there is no problem in the consistency between the input data number Si and the output data Number So during the counting period Ta, and, if there is a problem, the signal level is no longer inversed.

(4-2) Third Embodiment:

In the above embodiments, the switching circuit 246 is adapted to perform selective shutdown so that data other than the informative data are not outputted to the network controllers 210. However, an arrangement may be such that the switching circuit 246 shuts down outputs which are associated with all the data, and the informative data is outputted prior to this shutdown. For this purpose, steps S210, S360 and S460 of FIGS. 3, 4 and 5 may be substituted by steps S220, S370 and S470 of the same figures, respectively.

By arranged as described above, when the network relay apparatus 1 is diagnosed as having a fault, data output may be shut down, but this shutdown is carried out only after the informative data has been outputted. In this way, all the apparatuses associated with the networks which are connected to the network relay apparatus 1 via the network controllers 210 can be informed of the interruption of communication through the network relay apparatus 1. Thus, for example, all the apparatuses associated with the networks which are connected to the network relay apparatus 1 via the network controllers 210 may be adapted not to perform error processing once the informative data is received even when periodical communication is interrupted, so that unintended execution of error processing can be prevented.

(5) Modifications:

Some embodiments of the present invention have been described above. Needless to say, however, the present invention is not limited to the above embodiments, but may be implemented in various modifications as far as the modifications belong to the technical scope of the present invention.

For example, one of the above embodiments has illustrated the network relay apparatus 1 of the present invention, which is arranged as an apparatus for relaying data in a vehicle communication network according to CAN. However, the network relay apparatus of the present invention may be arranged as an apparatus for relaying data in a communication network according to communication standards other than CAN. Further, a plurality of networks may not necessarily follow the same communication protocol, but may follow different communication protocols. In this case, the network relay apparatus may be provided as a gateway apparatus having a function, for example, of protocol conversion.

One of the above embodiments has illustrated an arrangement in which the search engine 224 decides, based on the type of the data, an output port from which a data should be outputted. However, other additional information may be attached to the data so as to be referenced in deciding an output port from which a data should be outputted. For example, in case a communication network is one that follows a standard in which information indicative of an address is added to the header information of a data, and the data is transmitted being directed to this address, the search engine 224 may be adapted to reference the address of the data to search for an output port from which the data should be outputted.

One of the above embodiments has illustrated an arrangement in which the amount of standby data to be outputted from the output memories 232 of the output processor 230 is monitored at step S110 of FIG. 3, and the network relay apparatus 1 is kept in a standby state until the operation load associated with the amount of data becomes smaller than a predetermined load. However, the parameters monitored at step S110 may be other parameters if only they reflect the operation load of the network relay apparatus 1. In particular, for example, such parameters may include a processing load of the software processor 100, an operational condition of a vehicle provided with the network relay apparatus 1, and an amount of data passing through each of the paths between input ports and output ports.

One of the above embodiments has illustrated an arrangement in which the data table referenced by the search engine 224 at the time of deciding an output path is stored in the internal memory in the input processor 220. However, the data table may be stored in any memory region accessible by the search engine 224, such as other apparatus with which the network relay apparatus 1 can make data communication.

In the above embodiments, the hardware fault detector 300 may be arranged to perform error checking of data. To this end, a redundant data (ex., checksum data, CRC (cyclic Redundancy Checking) data and parity bit data) for checking errors may be added to an input data in a first path which is a specified path among the paths extending from the input-side input ports 221 to the output-side output ports 238. The "first path" here refers, for example, to a path in the search engine 224 on the side of the multiplexing block 222, and a path in the routing block 226 on the side of the search engine 224. Further, an arrangement may be so made that error checking is performed in a second path based on the redundant data added to the input data, the second path being nearer to the output-side outputs ports 238 than the first path. The "second path" here refers, for example, to a path in the search engine 224 on the side of the routing block 226, and a path in the routing block 226 on the side of the output processor 234. When an error is determined to be present as a result of this error checking, the same processes as steps S210 to S230 of FIG. 3 may be performed.

When an error is determined to be present as a result of the error checking based on the redundant data, it is very likely that a fault has occurred, which may cause rewriting of data, in the path between the first path and the second path. Under such circumstances, the hardware fault detector 300 finally diagnoses that a fault has occurred in the network relay apparatus 1.

The above arrangement enables diagnoses and hence detection on the occurrences of faults in the network relay apparatus 1 not only based on the input/output of the diagnostic data, but also based on the redundant data added to the data. In other words, in this arrangement, diagnoses on the faults of the network relay apparatus 1 can be given not only based on the diagnostic data, but also based on the data usually relayed by the network relay apparatus 1.

In the above embodiments, the hardware fault detector 300 may be arranged such that it can perform error processing of data. To this end, a redundant data (ex., CIRC (Cross Interleave Reed-Solomon Code), and Reed-Solomon code) for checking errors may be added to an input data in a first path which is a specified path among the paths extending from the input-side input ports 221 to the output-side output ports 238. The "first path" here refers to the same path as mentioned above. Further, an arrangement may be so made that error checking is performed in a second path based on the redundant data added to the input data, the second path being nearer to the output-side output ports 238 than the first path. The "second path" here refers to the same path as mentioned above.

The above arrangement enables correction of the input data based on the redundant data if a fault that would have caused rewriting of the input data, has occurred in a path after addition of the redundant data.

In the above embodiments, the diagnostic means is provided in the network relay apparatus. However, an arrangement corresponding to the diagnostic means may be provided in a fault diagnostic apparatus connected to the network relay apparatus for communicate with each other. For example, in the example shown in FIG. 8, this fault diagnostic apparatus may be arranged as an apparatus connected to any of the plurality of networks #1 to #4 so as to communicate with each other. In this example, the network relay apparatus may only have to have selecting means for deciding an output port which is to output a data inputted from an input port, based on the information added to the data, as well as output means for outputting the data from the decided output port.

In the fault diagnostic apparatus, a data having additional information with contents for deciding predetermined output port as an output port is produced as a diagnostic data. The produced diagnostic data is then inputted to an input port of the network relay apparatus. After the diagnostic data has been inputted to the network relay apparatus, if the diagnostic data is not outputted from the network relay apparatus, or if the output port from which the diagnostic data has been outputted does not coincide with a predetermined output port which should have been decided as an output port from which the diagnostic data is to be outputted, a diagnosis is given that an error has occurred in the network relay apparatus.

The thus arranged fault diagnostic apparatus can provide the same operation and effects as the network relay apparatus described above. This arrangement may have all the means other than the selecting means and the output means provided in the above network relay apparatus. With this arrangement, the same operation and effects as in the network relay apparatus described above can be obtained.

A program for allowing a computer system to execute a processing procedure for functioning as all the means provided in the network relay apparatus described above, should be encompassed by the present invention. A computer system controlled by such a program may constitute a portion of the network described above.

A program for allowing a computer system to execute a processing procedure for functioning as all the means provided in the fault diagnostic apparatus described above, should also be encompassed by the present invention. A computer system controlled by such a program may constitute a portion of the fault diagnostic apparatus described above.

It should be appreciated that each of the programs mentioned above is made up of a sequence in which commands suitable for processes by a computer system are sequenced. Such programs are provided to network relay apparatuses, fault diagnostic apparatuses, and users of these apparatuses through various recording mediums and communication networks.

(6) Correspondency with the Present Invention:

In each of the embodiments described above, the hardware fault detector 300 corresponds to the fault diagnostic apparatus according to the present invention and the fault diagnostic unit of the network relay apparatus according to the present invention. The input-side input ports 221 correspond to the input ports of the present invention, and the output-side output ports 238 correspond to the output ports of the present invention. The search engine 224 corresponds to the deciding unit (means) of the present invention, and the switching block 236 and the output memories 232 correspond to the output unit (means) of the present invention. The switching circuit 246 corresponds to the shutdown unit of the present invention.

Step S130 of FIG. 3 functionally corresponds to the producing unit (means) of the present invention. Steps S150 to S180 of FIG. 3 functionally correspond to one means included in the fault diagnostic unit according to the present invention. Steps S310 to S330 of FIG. 4 functionally correspond to the monitoring unit (means) of the present invention. S344 of FIG. 4 functionally corresponds to another means included in the fault diagnostic unit according to the present invention. S320 of FIG. 4 corresponds to the integrating unit of the present invention. Step S410 of FIG. 5 functionally corresponds to the means for producing registration data of the present invention. Step S434 of FIG. 5 functionally corresponds to another means included in the fault diagnostic unit according to the present invention. Step S346 of FIG. 6 functionally corresponds to the level inversing means of the present invention. Step S220 of FIG. 3, step S370 of FIG. 4, step S450 of FIG. 5, and step S570 of FIG. 7 functionally correspond to the means for outputting informative data of the present invention.

The present invention may be embodied in several other forms without departing from the spirit thereof. The embodiments and modifications described so far are therefore intended to be only illustrative and not restrictive, since the scope of the present invention is defined by the appended claims rather than by the description preceding them. All changes that fall within the metes and bounds of the claims, or equivalents of such metes and bounds, are therefore intended to be embraced by the claims.

What is claimed is:

1. A network relay apparatus located at one node of a network, said relay apparatus comprising:
    a plurality of input ports and a plurality of output ports, each of said input and output ports being communicably connected to a link of a network;
    a plurality of paths, each oath connecting one of the input ports to at least one of the output ports;
    a producing unit which produces a diagnostic data file having a target address which indicates a target output port that is one part of a target node of the network to which the diagnostic data file is to be delivered;
    a port selecting unit that reads the target address in the diagnostic data file to select a target output port that is at least one of the output ports through which the diagnostic data file is to be outputted to the target node;
    a path selecting unit that selects one of the paths as a selected path along which the diagnostic data file is to be carried to the target output port;
    an output unit which sends the diagnostic data file produced by the producing unit to the target output port selected by the port selecting unit via the selected path; and
    a fault diagnostic unit which detects which one of the output ports the diagnostic data file has arrived at to determine whether or not a fault has occurred in at least one of the port selecting unit, the path selecting unit and the plurality of paths in the network relay apparatus based on consistency between the output port at which the diagnostic data file has arrived and the target output port.

2. The network relay apparatus of claim 1, further comprising:
    a monitoring unit that monitors a usage rate of the network relay apparatus, wherein:
    the producing unit produces the diagnostic data file having the target address which indicates the target output port that is one of the nodes of the network to which the diagnostic data file is to be delivered, when the usage rate of the network relay apparatus is less than a predetermined value.

3. The network relay apparatus of claim 2, wherein the fault diagnostic unit determines that the fault has occurred in the network relay apparatus either in a first case where the diagnostic data file is not outputted through any one of the output ports of the network relay apparatus or a second case where the actual output port is inconsistent with the target output port.

4. The network relay apparatus of claim 3, wherein the producing unit produces a plurality of diagnostic data files, each of the diagnostic data files including a respective target address for one of the target nodes which determines through which one of the output ports each of the diagnostic data files should be outputted, and wherein the target nodes of the plurality of the diagnostic data files are different from each other.

5. The network relay apparatus of claim 4, wherein:
    the producing unit is configured to sequentially produce a plurality of diagnostic data files including target addresses which determine ones of the target nodes determining one of the output ports, the ones of the output ports being all of the output ports.

6. The network relay apparatus of claim 1, wherein:
    the output unit has a plurality of paths, each path leading to a respective output port,
    the monitoring unit monitors, as the usage rate of the network relay apparatus, an amount of data passing through the path leading to the target output port, and
    the producing unit produces the diagnostic data file when the amount of the data is less than a predetermined amount.

7. The network relay apparatus of claim 1, wherein the fault diagnostic unit includes:
    checking means for checking whether or not the number of times the target output port is selected by the port selecting unit is consistent with the number of times the diagnostic data files sent from the output unit are actually outputted from the target output port; and
    determining means for determining that the fault has occurred in the network relay apparatus in a case where the checking means informs that the numbers of both times are inconsistent with each other.

8. The network relay apparatus of claim 7, wherein:
    the checking means resumes by summing up the number of times the target output port is selected by the port selecting unit and the number of times the diagnostic data files sent from the output unit are actually outputted from the target output port, respectively, at a predetermined interval, and the determining means determines that the fault has occurred in a case where the number of times the target output port and the number of times the diagnostic data file sent from the output unit are actually outputted therefrom, both are summed up during some interval, do not agree with each other.

9. The network relay apparatus of claim 8, wherein:

the checking means has a two-valued check flag which is flipped if the number of times at each of which the target output port and the number of times at each of which the diagnostic data file inputted to the port selecting unit are actually outputted, both are summed up during some interval, coincide with each other, and the determining means is configured to determine that the fault has occurred when the two-valued check flag is not flipped at interval.

10. The network relay apparatus of claim 1, wherein the port selecting unit comprises a data table in which the relationships between the address and the target output ports are contained and which determines the target output port for the diagnostic data file.

11. The network relay apparatus of claim 10, wherein the fault diagnostic unit includes:

producing means for producing, at intervals, registration data indicating contents of the data table;

checking means for checking whether or not data in the data table at a check time when a predetermined time elapses after the registration data has been produced is consistent with the registration data; and determining means for determining that the fault has occurred in the network relay apparatus in a case where the checking means informs that the registration data and the data table at the check time are inconsistent with each other.

12. The network relay apparatus of claim 1, further comprising a shutting-off unit which closes the plurality of output ports so as to prevent data being output outside the network relay apparatus if the fault diagnostic unit determines a fault has occurred in the network relay apparatus.

13. The network relay apparatus of claim 12, further comprising:

an informative data output unit that outputs data indicating that a fault has occurred in the network relay apparatus even if the shutting-off unit closes the plurality of output ports.

14. The network relay apparatus of claim 12, further comprising:

a data output unit that outputs an announcement indicating that the plurality of output ports will be closed out of the network relay apparatus.

15. A computer-readable storage medium containing a computer program for execution by a computer in a network relay apparatus located at a network node, said relay apparatus having a plurality of input ports and a plurality of output ports, each of said plurality of input ports and said plurality of output ports communicably connecting to a link of said network, and wherein a plurality of paths each connect a respective one of the input ports to at least one of the output ports;

said computer program, when executed by said computer, causes the network relay apparatus to:

produce a diagnostic data file having a target address which indicates target output port that is part of a target node of the network to which the diagnostic data file is to be delivered;

read the target address in the diagnostic data file and select a target output port that is at least one of the output ports through which the diagnostic data file is to be outputted to the target node;

select one of the paths as a selected path along which the diagnostic data file is to be carried to the target output port;

send the diagnostic data file to the selected target output port via the selected path; and detect which one of the output ports the diagnostic data file has arrived at as an actual output port to determine whether or not a fault has occurred in at least one of the port selecting step, the path selecting step, and the plurality of the paths of the network relay apparatus based on consistency of the actual output port with the target output port.

* * * * *